United States Patent
Miyata

(10) Patent No.: US 10,656,870 B2
(45) Date of Patent: May 19, 2020

(54) INFORMATION PROCESSING APPARATUS THAT CONTROLS ACCESS TO NON-VOLATILE STORAGE MEDIUM, METHOD OF CONTROLLING THE SAME, AND STORAGE MEDIUM

(71) Applicant: CANON KABUSHIKI KAISHA, Tokyo (JP)

(72) Inventor: Takaaki Miyata, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 32 days.

(21) Appl. No.: 15/876,745

(22) Filed: Jan. 22, 2018

(65) Prior Publication Data
US 2018/0217781 A1 Aug. 2, 2018

(30) Foreign Application Priority Data
Jan. 31, 2017 (JP) .................................. 2017-015414

(51) Int. Cl.
*G06F 3/06* (2006.01)

(52) U.S. Cl.
CPC ............ *G06F 3/0653* (2013.01); *G06F 3/068* (2013.01); *G06F 3/0616* (2013.01); *G06F 3/0619* (2013.01); *G06F 3/0625* (2013.01); *G06F 3/0655* (2013.01); *G06F 3/0656* (2013.01)

(58) Field of Classification Search
CPC .... G06F 3/0646; G06F 3/0647; G06F 3/0655; G06F 3/0653
See application file for complete search history.

(56) References Cited

U.S. PATENT DOCUMENTS

| 8,176,344 | B2 | 5/2012 | Koshika et al. |
| 2012/0011329 | A1* | 1/2012 | Nonaka .................. G06F 3/0604 711/154 |
| 2013/0166839 | A1* | 6/2013 | Burton .................. G06F 3/0611 711/114 |

(Continued)

FOREIGN PATENT DOCUMENTS

JP 5209993 B2 6/2013

OTHER PUBLICATIONS

Aiguo He, A case study: File access privacy control using filer hook driver, IEEE International Symposium on Parallel and Distributed Processing with Applications. (Year: 2009).*

(Continued)

*Primary Examiner* — Khoa D Doan
(74) *Attorney, Agent, or Firm* — Rossi, Kimms & McDowell LLP

(57) ABSTRACT

An information processing apparatus that controls access to a non-volatile storage medium mounted therein to thereby make it possible to prevent occurrence of a read/write error and physical damage to the non-volatile storage medium. The information processing apparatus includes an HDD as the non-volatile storage medium and a RAM disk on a RAM as the volatile storage medium. An API hook hooks a system call that uses a file descriptor. A frequency of access to a file in the HDD is detected by using the API hook. When the access frequency of a file has exceeded a predetermined value, the access destination of the file is changed from the HDD to the RAM disk, by using the API hook.

17 Claims, 12 Drawing Sheets

(56) References Cited

U.S. PATENT DOCUMENTS

| | | | |
|---|---|---|---|
| 2014/0082717 A1* | 3/2014 | Kang | G06F 21/00 726/9 |
| 2015/0106582 A1* | 4/2015 | Mai | G06F 3/0649 711/165 |
| 2016/0071552 A1* | 3/2016 | Ohwada | H02J 9/061 365/185.08 |

OTHER PUBLICATIONS

Maiko Furusawa, Daisuke Suzuki, Yuuki Ashino, Ryoichi Sasaki, Development of a System Using APIHook Function to Protect Personal Information Leakage from USB Memory; 2009 2nd International Conference on Computer Science and its Applications. IEEE 2009 (Year: 2009).*

* cited by examiner

INFORMATION PROCESSING APPARATUS THAT CONTROLS ACCESS TO NON-VOLATILE STORAGE MEDIUM, METHOD OF CONTROLLING THE SAME, AND STORAGE MEDIUM

BACKGROUND OF THE INVENTION

Field of the Invention

The present invention relates to an information processing apparatus, a method of controlling the same, and a storage medium, and more particularly to an information processing apparatus that controls access to a non-volatile storage medium mounted therein, such as an HDD, a method of controlling the same, and a storage medium.

Description of the Related Art

Conventionally, there are cases where an image forming apparatus frequently receives access to an HDD mounted therein from an internal application or a server connected via a network, during standby in a state capable of performing data transmission and reception via the network (network standby state) or during standby in a power-saving state (power-saving standby state).

In such a case, there is a possibility that a time period (access time) during which a magnetic head of the HDD is on a platter (magnetic disk) exceeds an HDD duty cycle of 20% which is a reference for the stable operation of HDDs for consumers. If the access time exceeds the HDD duty cycle of 20% as above, this increases a probability that grease evaporated from a bearing by rotation of the platter deposits on the magnetic head as foreign matter (particles) due to a change in air pressure between the magnetic head and the platter. Further, this can cause not only an increase in the probability of occurrence of a read/write error of the HDD, but also, in the worst case, physical damage to the HDD.

Here, to reduce the HDD duty cycle, there is a method in which data in the HDD is temporarily saved in a different storage device, and the data is accessed on the different storage device.

For example, for an image forming apparatus having a power-saving function, there has been proposed a technique of temporarily transferring data in the HDD to a RAM disk on a RAM when the image forming apparatus is shifted to a suspended mode, and the data having been transferred to the RAM disk is returned to the HDD when the operation of the image forming apparatus is resumed (see e.g. Japanese Patent No. 5209993). This eliminates the need of accessing the data in the HDD during the power-saving state, and hence it is possible to turn off the power supply to the HDD.

However, in Japanese Patent No. 5209993, the data in the HDD can be transferred to the RAM disk only when the image forming apparatus is shifted to the suspended mode. That is, this technique cannot reduce the HDD duty cycle when the HDD is frequently accessed in a state other than the power-saving standby state, such as the network standby state.

SUMMARY OF THE INVENTION

The present invention provides an information processing apparatus that controls access to a non-volatile storage medium mounted therein, such as an HDD, to thereby make it possible to prevent occurrence of a read/write error and physical damage to the non-volatile storage medium, a method of controlling the same, and a storage medium.

In a first aspect of the present invention, there is provided an information processing apparatus including a non-volatile storage medium and a volatile storage medium, comprising a hook unit configured to hook a system call that uses a file descriptor, a detection unit configured to detect a frequency of access to a file stored in the non-volatile storage medium, by using the hook unit, and an access destination change unit configured to change an access destination of a file whose detected access frequency has exceeded a predetermined value, from the non-volatile storage medium to the volatile storage medium, by using the hook unit.

In a second aspect of the present invention, there is provided an information processing apparatus including a non-volatile storage medium and a volatile storage medium, comprising a hook unit configured to hook a system call that uses a file descriptor, a detection unit configured to detect a frequency of access to a file stored in the non-volatile storage medium, by using the hook unit, and an access destination change unit configured to change, in a case where a file whose detected access frequency has exceeded a predetermined value is accessed in order to additionally write data therein, only an access destination of the data which has been additionally written in the file, to the volatile storage medium, by using the hook unit.

In a third aspect of the present invention, there is provided a method of controlling an information processing apparatus including a non-volatile storage medium and a volatile storage medium, comprising hooking a system call that uses a file descriptor, by using an API hook, detecting a frequency of access to a file stored in the non-volatile storage medium, by using the API hook, and changing an access destination of a file whose detected access frequency has exceeded a predetermined value, from the non-volatile storage medium to the volatile storage medium, by using the API hook.

In a fourth aspect of the present invention, there is provided a method of controlling an information processing apparatus including a non-volatile storage medium and a volatile storage medium, comprising hooking a system call that uses a file descriptor, by using an API hook, detecting a frequency of access to a file stored in the non-volatile storage medium, by using the API hook, and changing, in a case where a file whose detected access frequency has exceeded a predetermined value is accessed in order to additionally write data therein, only an access destination of the data which has been additionally written in the file, to the volatile storage medium, by using the hook unit.

In a fifth aspect of the present invention, there is provided a non-transitory computer-readable storage medium storing a computer-executable program for executing a method of controlling an information processing apparatus including a non-volatile storage medium and a volatile storage medium, wherein the method comprises hooking a system call that uses a file descriptor, by using an API hook, detecting a frequency of access to a file stored in the non-volatile storage medium, by using the API hook, and changing an access destination of a file whose detected access frequency has exceeded a predetermined value, from the non-volatile storage medium to the volatile storage medium, by using the API hook.

In a sixth aspect of the present invention, there is provided a non-transitory computer-readable storage medium storing a computer-executable program for executing a method of controlling an information processing apparatus including a non-volatile storage medium and a volatile storage medium, wherein the method comprises hooking a system call that uses a file descriptor, by using an API hook, detecting a frequency of access to a file stored in the non-volatile storage medium, by using the API hook, and changing, in a case where a file whose detected access frequency has exceeded a predetermined value is accessed in order to additionally write data therein, only an access destination of the data which has been additionally written in the file, to the volatile storage medium, by using the hook unit.

According to the present invention, it is possible to prevent occurrence of a read/write error and physical damage to the HDD.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
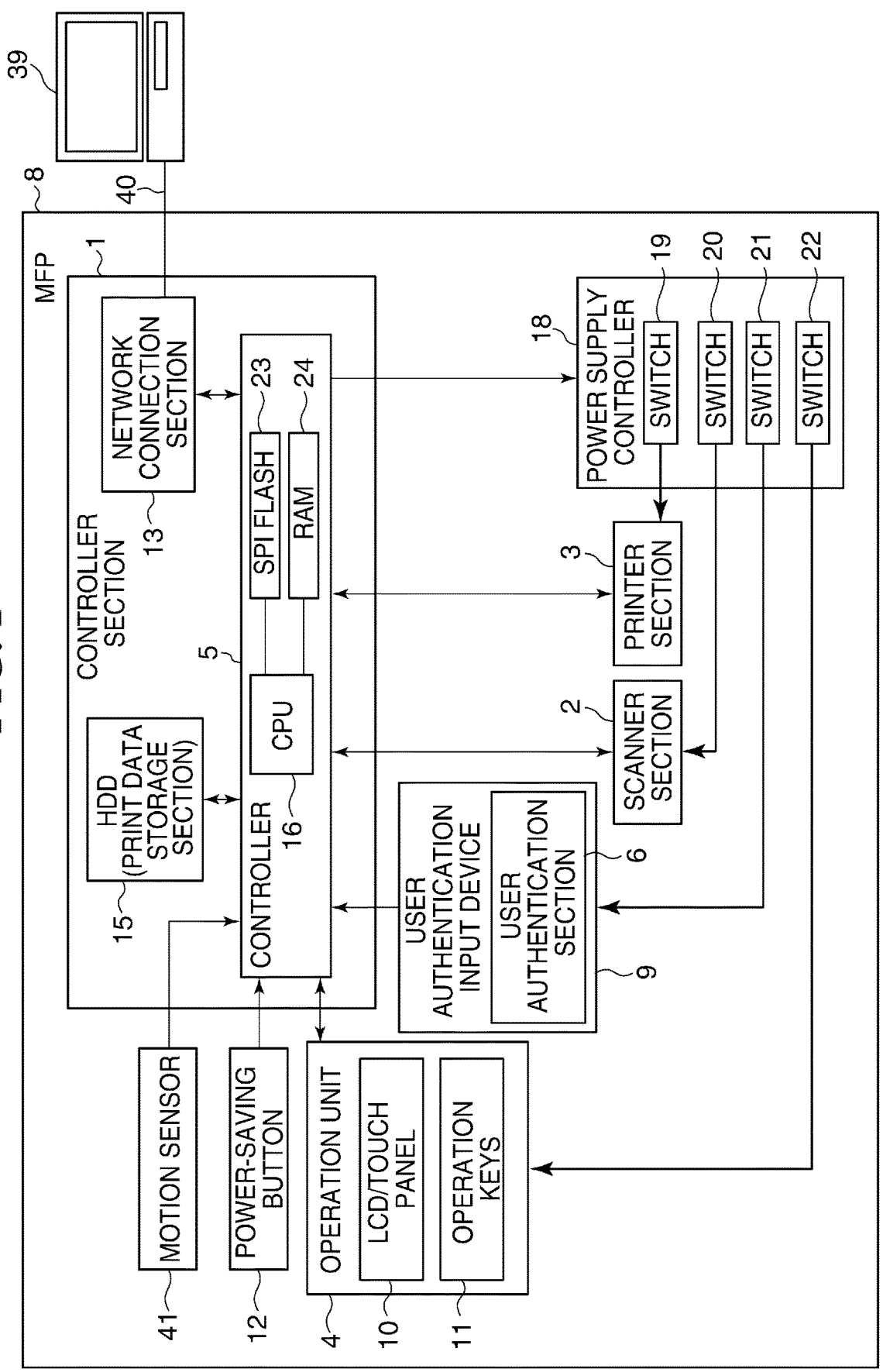
FIG. 1 is a block diagram of hardware configuration of an MFP.

FIG. 1 is a block diagram of hardware configuration of an MFP 8 as an example of an information processing apparatus according to an embodiment of the present invention.

An operation unit 4 is formed by an LCD/touch panel 10 and operation keys 11. The LCD/touch panel 10 is provided to display information and button images to a user, and then enable the user to perform interactive operations by pressing the buttons e.g. with his/her finger. The operation keys 11 include often-used buttons, such as numeric buttons for designating e.g. the number of copies to be printed, a copy button, and a stop button, which are formed by physical button switches.

A motion sensor 41 is physically disposed in the vicinity of the operation unit 4. A threshold value of detection of a moving object by the motion sensor 41 can be set stepwise from the operation unit 4. For example, the threshold value can be set to a value at which the motion sensor 41 can detect a user coming toward the MFP 8 even when the user is far from the MFP 8. Alternatively, the threshold value can be set to a value at which the motion sensor 41 can detect a user only after the user comes very close to the MFP 8. In a case where the motion sensor 41 detects a user when the power mode of the MFP 8 is in a power-saving mode, the MFP 8 can be shifted to a standby mode. Here, the power-saving mode refers to a power mode including an S3 state of a CPU 16, and the standby mode refers to a power mode including an S0 state of the CPU 16.

A power-saving button 12 is a switch physically disposed in the vicinity of the operation unit 4 or on the same unit including the operation unit 4, for shifting the MFP 8 to the power-saving mode and returning the MFP 8 from the power-saving mode. More specifically, the power-saving button 12 is provided in a manner electrically isolated from the operation unit 4 so as to make it possible to detect pressing of the power-saving button 12 even when power supply to the operation unit 4 is turned off by a switch 22 of a power supply controller 18, referred to hereinafter. That is, the power-saving button 12 is connected to a controller 5 independently in a state isolated from the operation unit 4. The power-saving button 12 has a toggle switch mechanism which makes it possible to shift the MFP 8 to the power-saving mode and to the standby mode as the user repeatedly presses the power-saving button 12.

A user authentication input device 9 includes a user authentication section 6 which performs user authentication for authorized printing.

A controller section 1 is comprised of the controller 5, a network connection section 13, and a print data storage section 15. The network connection section 13 receives a request from a PC 39 e.g. via a network 40. The print data storage section 15 is a memory implemented by an HDD for storing received print data (hereinafter referred to as the "HDD 15"). The controller 5 is a device comprised of the CPU 16, an SPI flash memory 23, and a RAM 24, and is interconnected to the network connection section 13 and the HDD 15 to control the overall operation of the controller section 1. The CPU 16 performs processing e.g. for determining whether or not external data received via the network connection section 13 is print data. The SPI flash memory 23 stores control firmware necessary for starting the CPU 16. The RAM 24 temporarily stores commands to the CPU 16, and part of its memory area is formed, on an as-needed basis, as a RAM disk into which data can be written.

Further, the power supply controller 18 includes switches 19 to 22 which can be remotely controlled by the CPU 16 so as to finely control power supply to a printer section 3, a scanner section 2, the user authentication input device 9, and the operation unit 4, to thereby reduce a waiting time of a user who waits for the MFP 8 to be returned from the power-saving mode. These switches 19 to 22 are connected to the printer section 3, the scanner section 2, the user authentication input device 9, and the operation unit 4, respectively, as indicated by arrows in FIG. 1, and the CPU 16 controls the overall electric power of the MFP 8 by controlling on/off of these switches 19 to 22. Note that these switches 19 to 22 may be formed by an FET, a relay, or the like.

Further, as for the HDD 15 of the controller section 1, it is possible to shift the HDD 15 alone to the power-saving state according to an instruction from the CPU 16 even when the MFP 8 is in the standby mode.

Next, a description will be given of the operation of an API hook for hooking a system call that uses a file descriptor, which is performed by the MFP 8 as an example of the information processing apparatus according to the embodiment, with reference to FIGS. 2 to 6.

Figure 2:
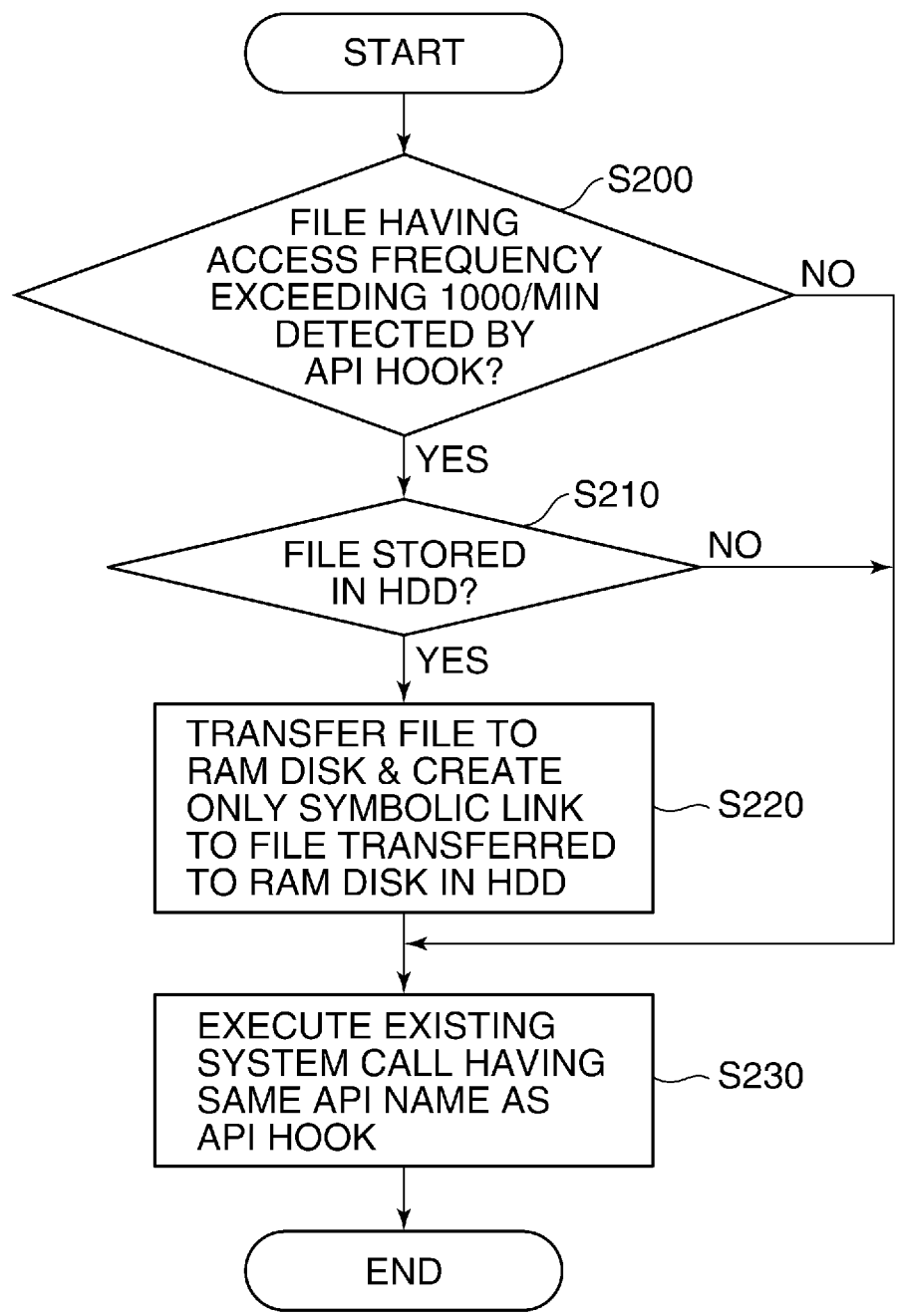
FIG. 2 is a flowchart of a process, performed by the MFP, for transferring a file from an HDD.

FIG. 2 is a flowchart of a process performed by the MFP 8, for transferring a file from the HDD 15. In this process, in a case where the frequency of access to a file in the HDD 15 has exceeded 1000 times per minute, a symbolic link of the file is created in the HDD 15, and the file is transferred to the RAM disk. This process is performed by the CPU 16 that loads an associated program stored in the HDD 15, for executing this process, into the RAM 24.

Here, the API hook refers to a library function that has the same API name as an existing system call and adds an operation desired by a programmer to the operation of the existing system call, as an operation to be performed before executing the operation of the existing system call. In the case of the process shown in FIG. 2, as the operation to be performed by using an API hook before executing the operation of an existing system call that uses a file descriptor, such as read ( ) or write ( ) there are added the following three operations: detecting the frequency of access to a file, creating a symbolic link, and transferring the file to the RAM disk. In doing this, it is possible to count the frequency of access to a file, by sharing information of the access frequency between API hooks each using the same file descriptor.

Here, there is a problem that the API hook and the existing system call use the same API name. In a case where Linux (registered trademark) is used as an operating system, the problem of a plurality of API's having the same API name is solved by making use of characteristics that an API name is retrieved in the order of loading of libraries, and an API name retrieved first is used. More specifically, an environment variable LD_PRELOAD is set so as to load a function library including an API hook earliest. With this, even when an application calls e.g. a system call of read ( ) read ( ) which is an existing system call is not called, but read ( ) which is an API hook is called.

In a step S200, the CPU 16 detects, by using an API hook, whether an access frequency to a file has exceeded 1000 times per minute. If the answer to the question of this step is negative (NO), the CPU 16 proceeds to a step S230. Although in the present embodiment, as a reference for determining whether the access frequency to a file is too high, there is used a value of 1000 times per minute, by way of example, this is not limitative, but the determination is only required to be performed with reference to a predetermined appropriate value. The same is applied to other embodiments, described hereafter.

If the answer to the question of the step S200 is affirmative (YES), the CPU 16 proceeds to a step S210, wherein the CPU 16 determines whether or not the file exists in the HDD 15. If it is determined in the step S210 that the file does not exist in the HDD 15, the CPU 16 proceeds to the step S230.

If it is determined in the step S210 that the file exists in the HDD 15, the CPU 16 proceeds to a step S220, wherein the API hook creates a symbolic link to the file, in the HDD 15, and transfers the file to the RAM disk, leaving only the symbolic link in the HDD 15. Then, the CPU 16 proceeds to the step S230.

In the step S230, the CPU 16 executes the existing system call having the same API name as the API hook, followed by terminating the present process.

By performing the above-described process, if the frequency of access to a file in the HDD 15 has exceeded 1000 times per minute, the access destination of the file is changed to the RAM disk. This makes it possible to suppress occurrence of a too frequent access to the HDD 15, and thereby reduce the HDD duty cycle.

Figure 3:
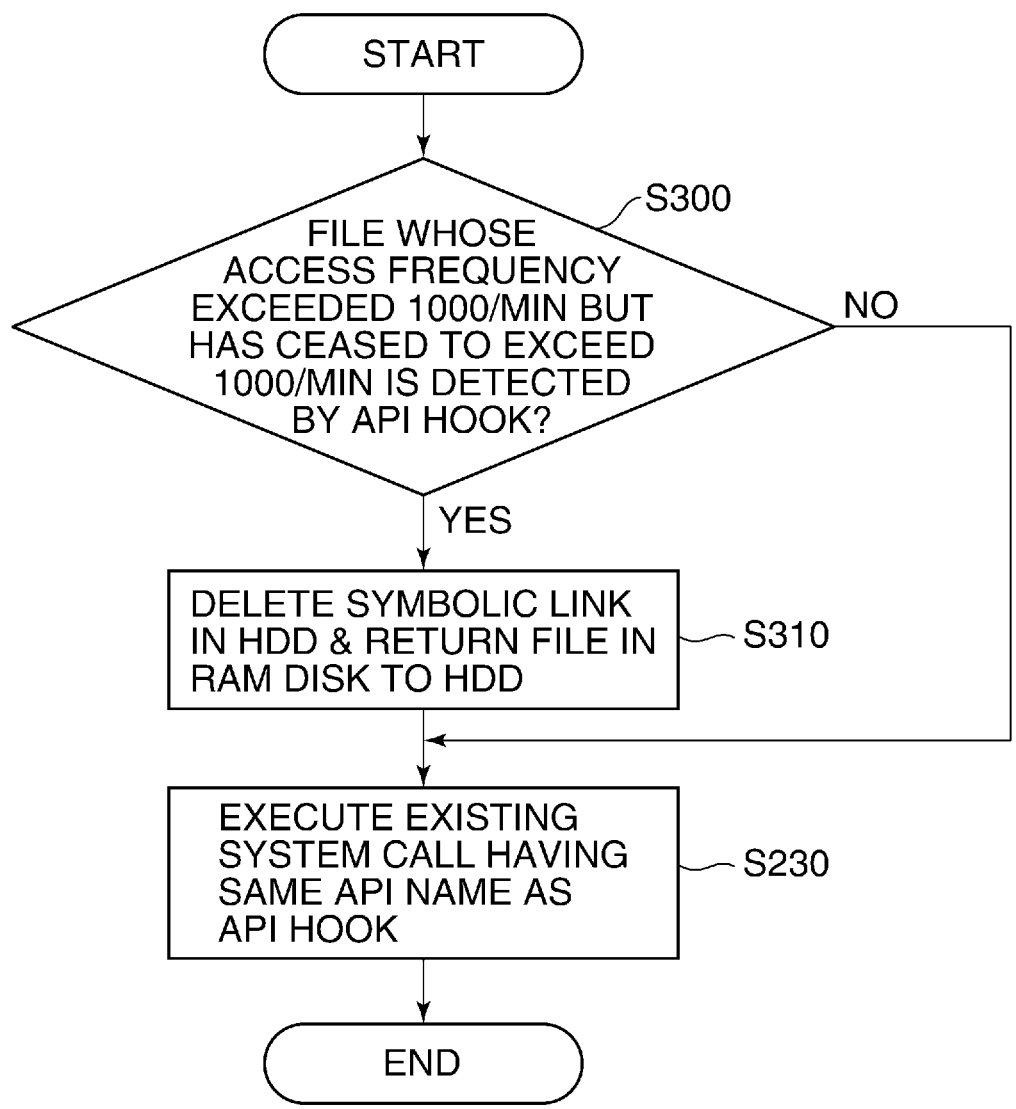
FIG. 3 is a flowchart of a file re-transferring process performed by the MFP.

FIG. 3 is a flowchart of a file re-transferring process performed by the MFP 8. In this file re-transferring process, if the frequency of access to a file transferred to the RAM disk by the process in FIG. 2 has ceased to exceed 1000 times per minute, the file is returned to the HDD 15. This process is performed by the CPU 16 that loads an associated program stored in the HDD 15, for executing this process, into the RAM 24.

In the process in FIG. 3, as the operation to be performed by using an API hook before executing the operation of an existing system call that uses a file descriptor, there are added the following operations: detecting the frequency of access to a file, deleting a symbolic link, and transferring the file to the HDD 15. Other features of the API hook are the same as those in FIG. 2.

In a step S300, the CPU 16 detects, by using an API hook, whether the access frequency of a file whose access frequency exceeded 1000 times per minute has ceased to exceed 1000 times per minute. If the answer to the question of this step is negative (NO), the CPU 16 proceeds to the step S230.

If the answer to the question of the step S300 is affirmative (YES), the CPU 16 proceeds to a step S310, wherein the symbolic link of the file is deleted from the HDD 15 and the file in the RAM disk is returned to the HDD 15, by using the API hook. Then, the CPU 16 proceeds to the step S230.

In the step S230, the CPU 16 executes the existing system call having the same API name as the API hook, followed by terminating the present process.

By performing the above-described process, in a case where the frequency of access to a file, which was transferred to the RAM disk by the process in FIG. 2, has ceased to exceed 1000 times per minute, the file is returned to the HDD 15, whereby it is possible to make effective use of the RAM disk having the limited capacity.

Figure 4:
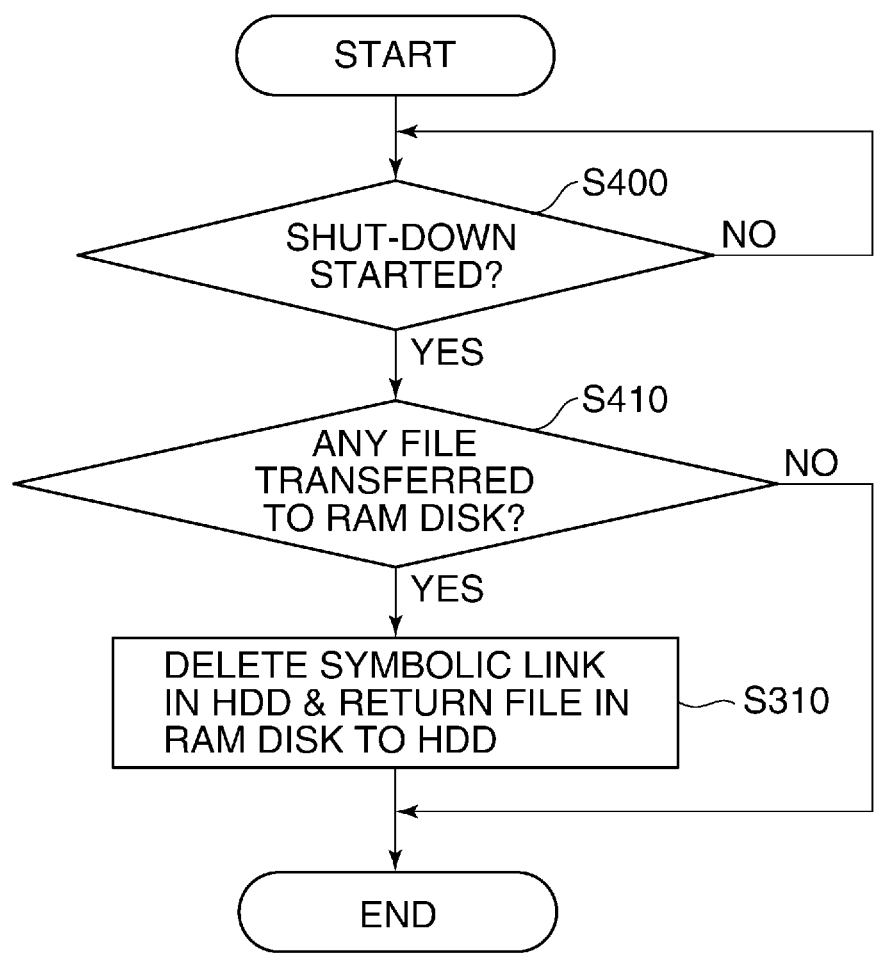
FIG. 4 is a flowchart of a file re-transferring process performed by the MFP when shut-down is started.

FIG. 4 is a flowchart of a file re-transferring process performed by the MFP 8 when shut-down is started. In this process, all of the files, which have been transferred to the RAM disk by the process in FIG. 2, are returned to the HDD 15 when shut-down is started. This process is performed by the CPU 16 that loads an associated program stored in the HDD 15, for executing this process, into the RAM 24.

In the file re-transferring process in FIG. 4, the MFP 8, which is configured to perform the process in FIG. 2 or 3 when executing the operation of an existing system call that uses a file descriptor, by using an API hook, performs the following four operations before starting the shut-down: detecting the start of the shut-down, detecting files which have been transferred to the RAM disk, deleting symbolic links, and transferring the files to the HDD 15.

In a step S400, the CPU 16 detects whether or not the shut-down has been started, by using the API hook. If the shut-down has not been started, the step S400 is repeatedly executed until the shut-down is started.

If it is determined in the step S400 that the shut-down has been started, the CPU 16 proceeds to a step S410, and searches for any files which have been transferred to the RAM disk by the process in FIG. 2, by using an API hook. If no files are detected in this step, the present process is immediately terminated.

If any files transferred to the RAM disk are detected in the step S410, the CPU 16 proceeds to the step S310, wherein the symbolic links of the detected files are deleted from the HDD 15, and the detected files in the RAM disk are returned to the HDD 15, by using the API hook, followed by terminating the present process.

By performing the above-described process, all of the files, which have been transferred to the RAM disk by the process in FIG. 2, are returned to the HDD 15 when the shut-down is started, whereby it is possible to prevent the files in the RAM disk from being lost due to the shut-down.

Figure 5:
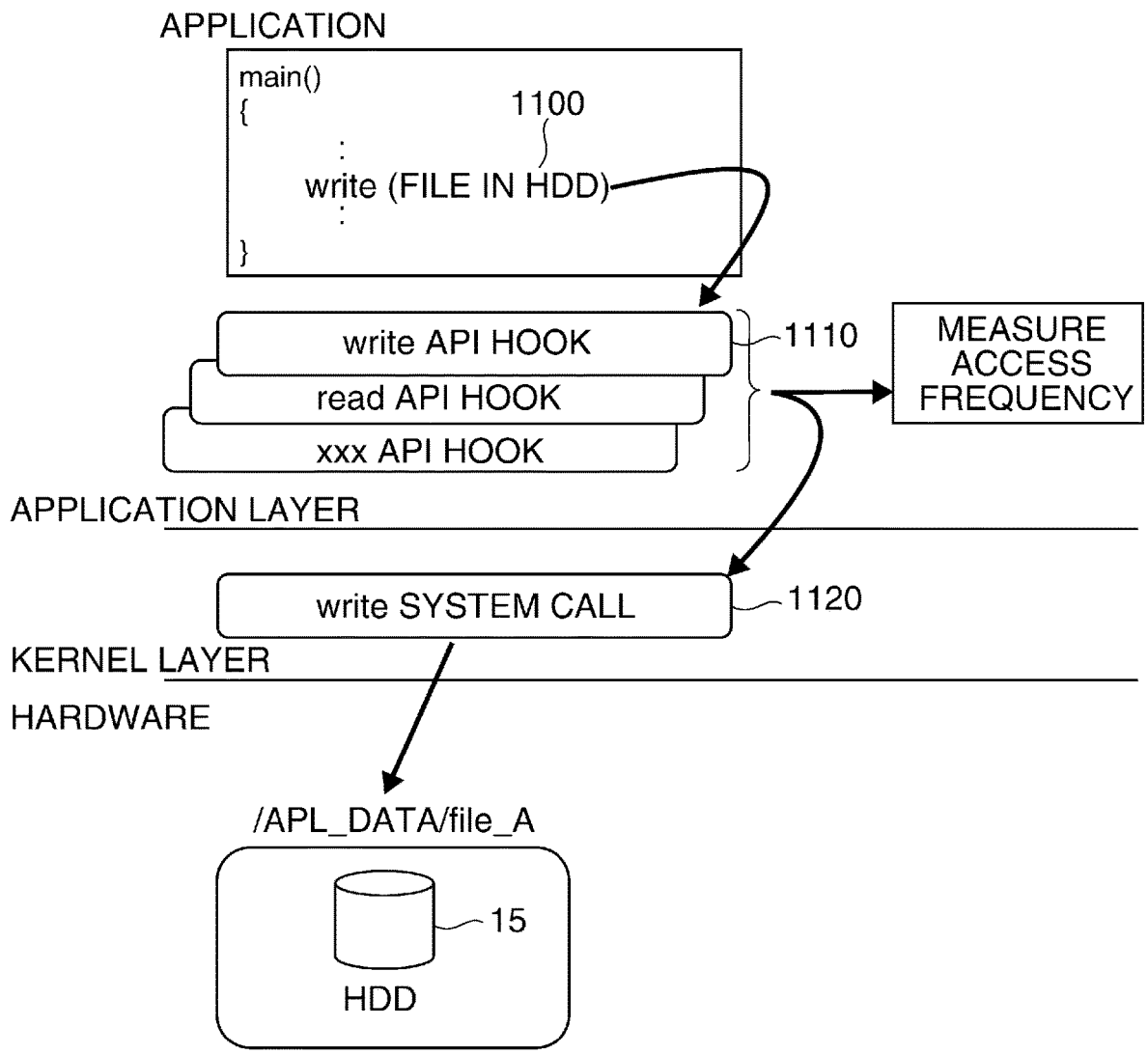
FIG. 5 is a diagram showing a flow of processing performed by the MFP by using an API hook in a case where the frequency of access from an application to a file in the HDD does not exceed 1000 times per minute.

FIG. 5 is a diagram showing a flow of processing performed by the MFP 8 by using the API hook in a case where the frequency of access from an application to a file in the HDD 15 does not exceed 1000 times per minute.

Although with reference to FIG. 5, the following description is given of a case where the application executes only a write function as a function of the file descriptor, the same processing as the following processing is performed when the functions of other file descriptors are executed. Further, information on the frequency of access to each file stored in the HDD 15 is shared between the API hooks each using the same file descriptor.

First, in a case where the write function, denoted by reference numeral 1100, is executed by the application for a file /APL_DATA/file_A stored in the HDD 15, the CPU 16 does not call a write system call 1120, but calls a write API hook 1110.

Next, the CPU 16 counts the frequency of access to a file (file access frequency) per unit time for a file designated by an argument of the write function 1100 of the application, using the write API hook 1110. That is, in this case, the file access frequency per unit time with respect to the file /APL_DATA/file_A is counted. In the illustrated example in FIG. 5, the frequency of access to the file /APL_DATA/file_A does not exceed 1000 times per minute, and hence the write system call 1120 is directly called.

Finally, data is written into the file /APL_DATA/file_A in the HDD 15 by the write system call 1120.

Figure 6:
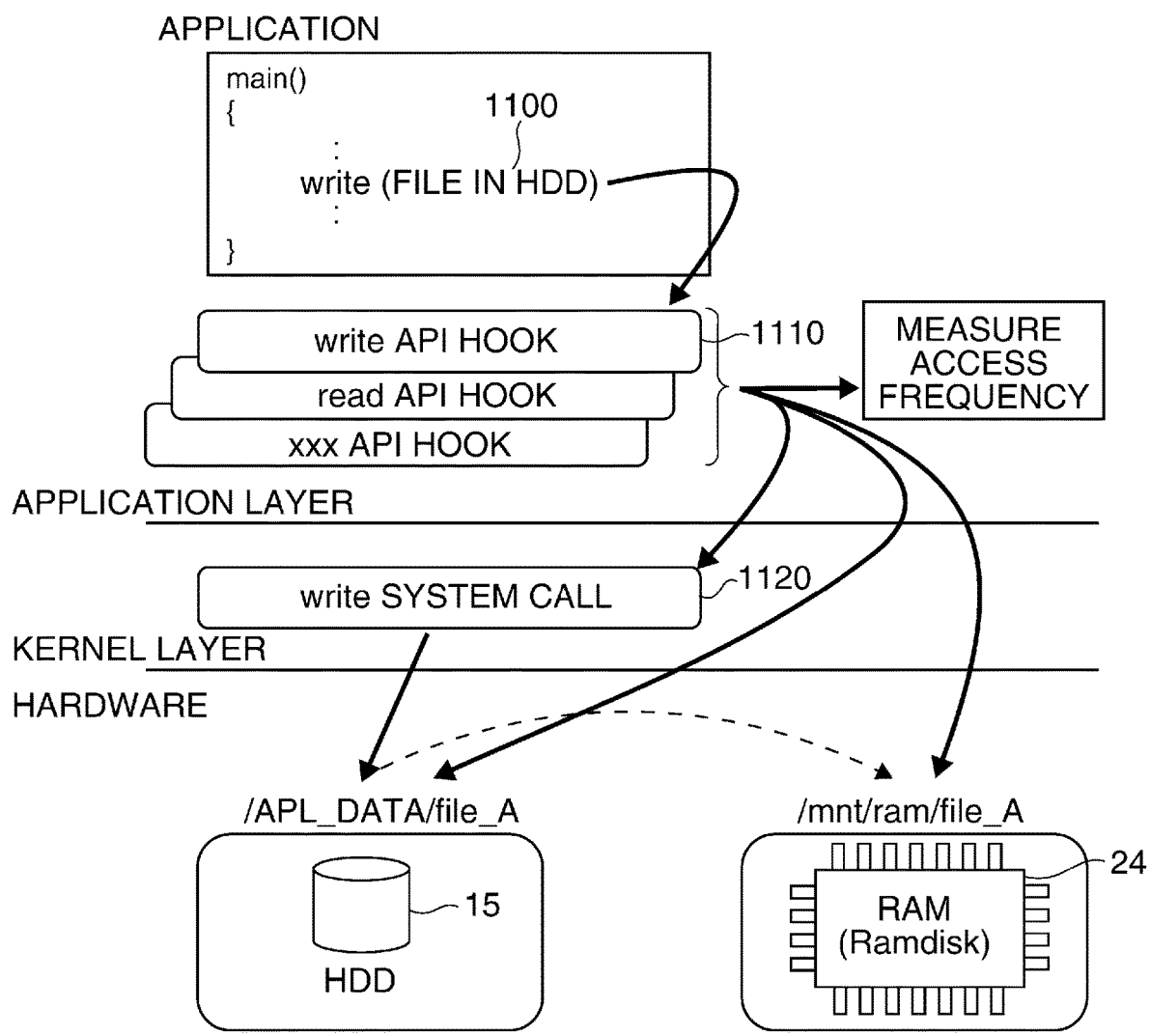
FIG. 6 is a diagram showing a flow of processing performed by the MFP by using an API hook in a case where the frequency of access from an application to a file in the HDD has exceeded 1000 times per minute.

FIG. 6 is a diagram showing a flow of processing performed by the MFP 8 by using the API hook in a case where the frequency of access from an application to a file in the HDD 15 has exceeded 1000 times per minute.

Although in FIG. 6, similar to FIG. 5, the description is given of the case where the application executes only the write ( ) function as a function of the file descriptor, the same processing as the following processing is performed in a case where the functions of other file descriptors are executed. Further, information on the frequency of access to each file stored in the HDD 15 is shared between the API hooks each using the same file descriptor.

First, in a case where the write ( ) function 1100 is executed by the application with respect to the file /APL_DATA/file_A in the HDD 15, the write API hook 1110 is called.

Next, the CPU 16 counts the file access frequency per unit time with respect to the file /APL_DATA/file_A by using the API hook 1110. In FIG. 6, as a result of this counting, the access to this file occurs at a frequency exceeding 1000 times per minute. Therefore, first, the file /APL_DATA/file_A in the HDD 15 is transferred to the RAM disk as a file /mnt/ram/file_A, by using the write API hook 1110. Next, the CPU 16 creates a file /APL_DATA/file_A in the HDD 15 as a symbolic link to the file /mnt/ram/file_A, by using the write API hook 1110. Then, the write system call 1120 is called.

Finally, data is written into the file /mnt/ram/file_A in the RAM disk which is an entity to which the symbolic link /APL_DATA/file_A in the HDD 15 is linked, by the write system call 1120.

Next, a description will be given of a first variation of the MFP 8 as the example of the information processing apparatus according to the embodiment of the present invention. The first variation is different from the embodiment in that when a file in the HDD 15 is transferred to the RAM disk by the API hook, a symbolic link to the file in the RAM disk is not created, but is the same as the embodiment in other respects. Therefore, the same component elements as those of the embodiment are denoted by the same reference numerals, and description thereof is omitted.

Figure 7:
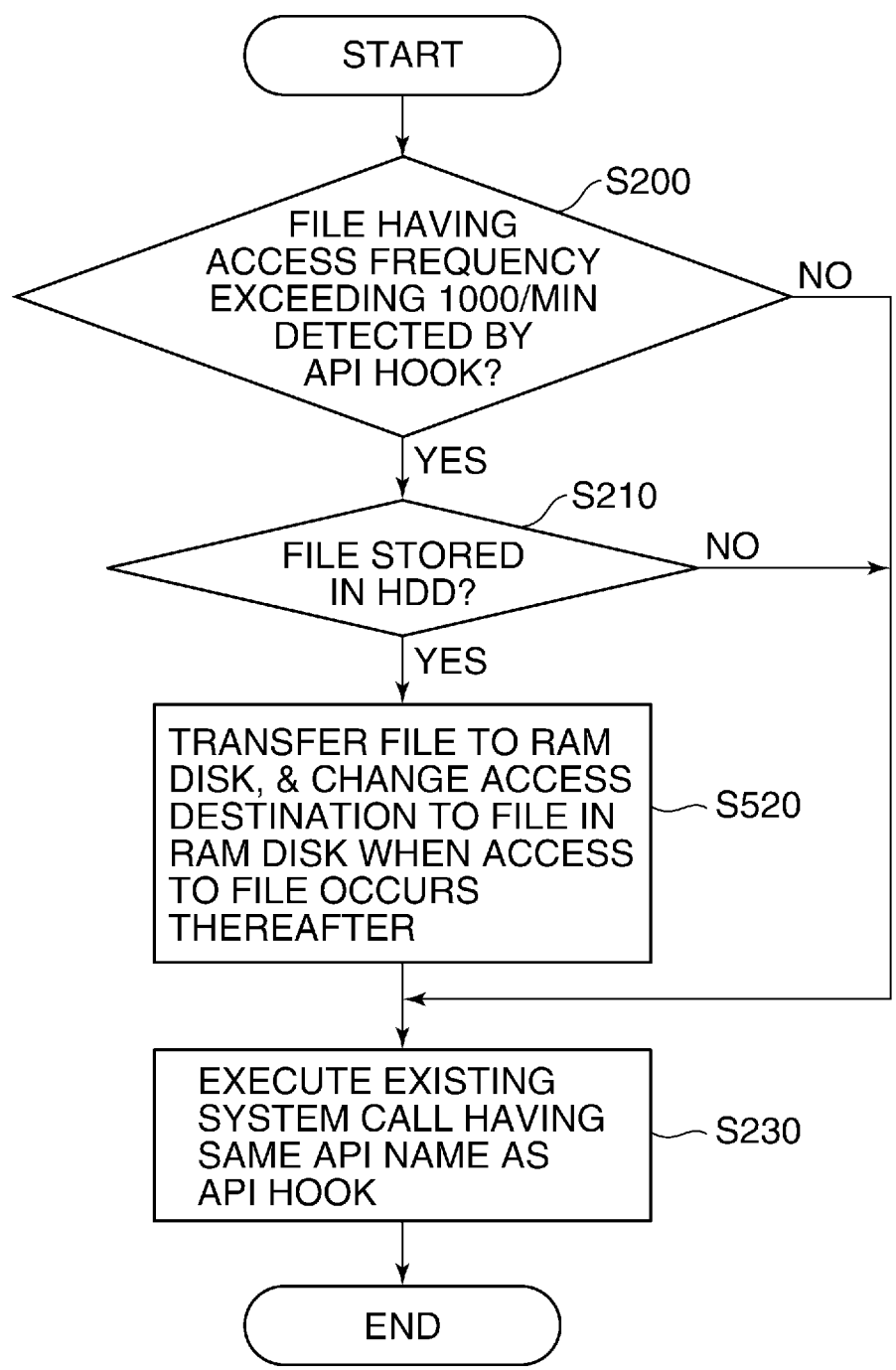
FIG. 7 is a flowchart of a process performed by a first variation of the MFP, for transferring a file from the HDD.
Figure 8:
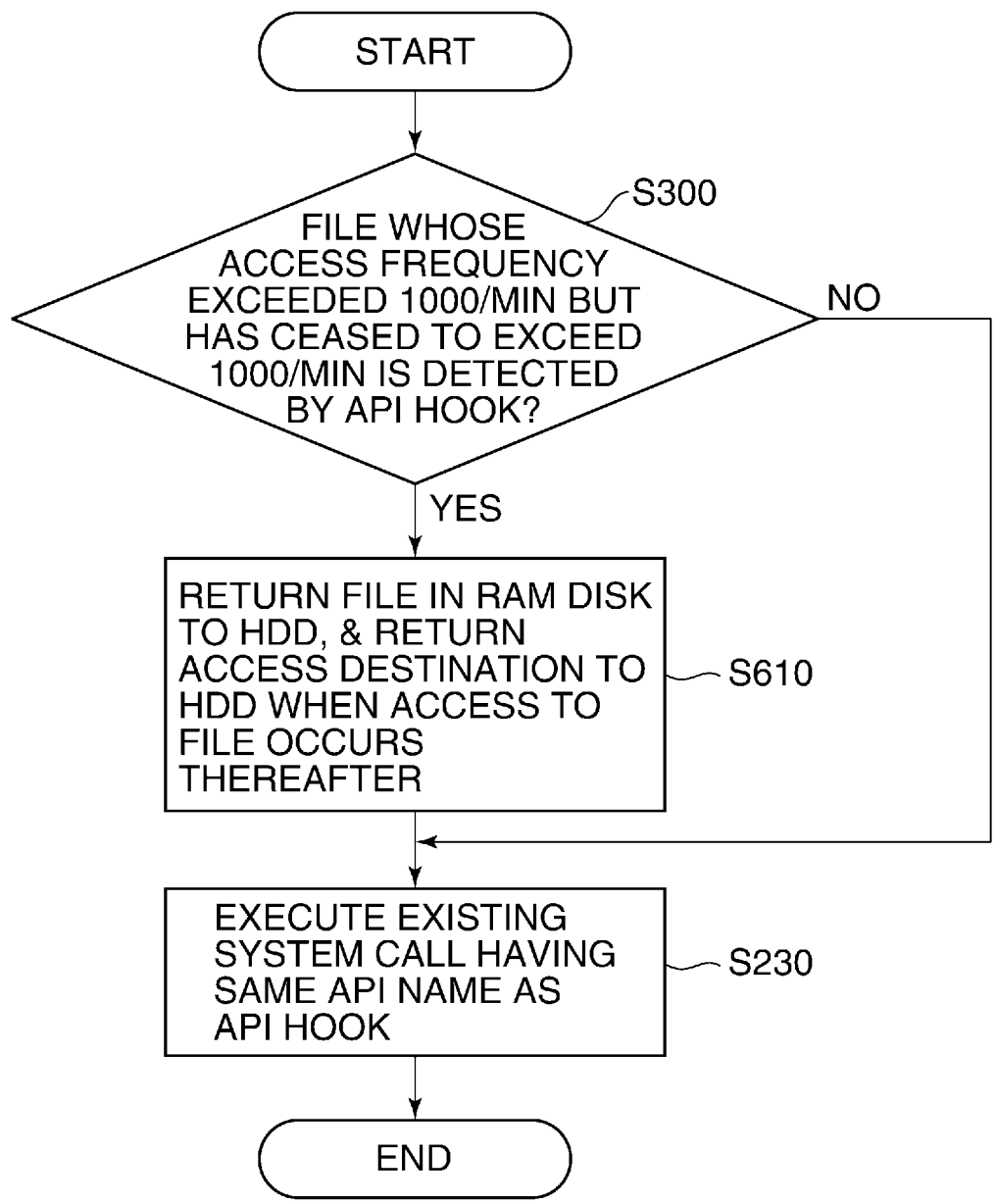
FIG. 8 is a flowchart of a file re-transferring process performed by the first variation of the MFP.
Figure 9:
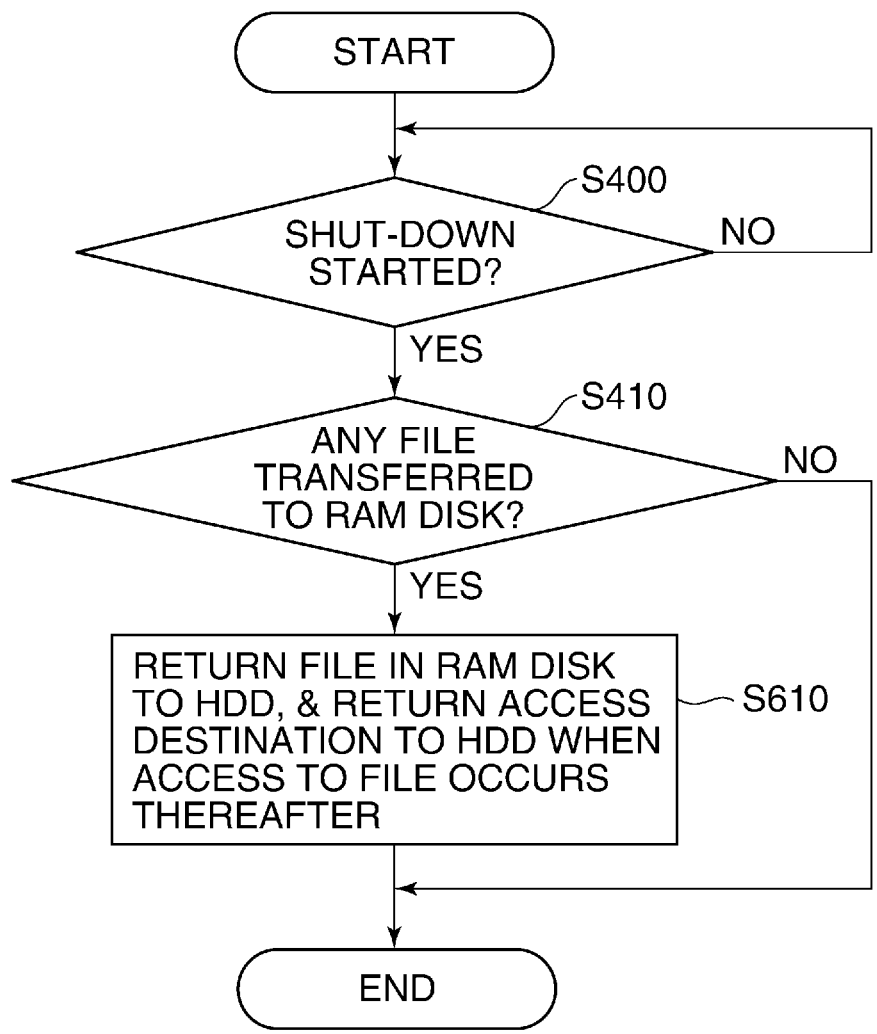
FIG. 9 is a flowchart of a file re-transferring process performed by the first variation of the MFP when shut-down is started.

The following description is given of the operation of an API hook for hooking a system call that uses a file descriptor, which is performed by the first variation of the MFP 8, with reference to FIGS. 7 to 9.

FIG. 7 is a flowchart of a process performed by the first variation of the MFP 8, for transferring a file from the HDD. In this process, in a case where the frequency of access to a file in the HDD 15 has exceeded 1000 times per minute, the file is transferred to the RAM disk. After that, when there is an access to the file, the access destination is changed to the RAM disk to which the file has been transferred. This process is performed by the CPU 16 that loads an associated program stored in the HDD 15, for executing this process, into the RAM 24.

The process in FIG. 7 is the same as the embodiment in that the operations for detecting the access frequency to a file and transferring the file to the RAM disk are added as the operation to be performed by using an API hook before executing an existing system call that uses a file descriptor. In the first variation, not only these operations, but also an operation for changing, after transferring the file to the RAM disk, the access destination of the file from the HDD 15 to the RAM disk is added. As one of methods for performing this operation, for example, when a file is transferred to the RAM disk, the file descriptor of the file in the RAM disk is acquired by an open system call. With this, in a case where there is an access to the file in the HDD 15 after that, it is possible to access the file by replacing the file descriptor by the acquired file descriptor of the file in the RAM disk.

According to the first variation of the MFP 8, in a case where the frequency of access to a file in the HDD 15 has exceeded a predetermined value, it is possible to transfer the file to the RAM disk without making the application conscious of the transfer.

Referring to FIG. 7 in which the step S220 in FIG. 2 is changed into a step S520, first, in the step S200, the CPU 16 detects, by using an API hook, whether an access frequency to a file has exceeded 1000 times per minute. If the answer to the question of this step is negative (NO), the CPU 16 proceeds to the step S230.

If the answer to the question of the step S200 is affirmative (YES), the CPU 16 proceeds to the step S210, wherein the CPU 16 determines whether or not the file exists in the HDD 15. If it is determined in the step S210 that the file does not exist in the HDD 15, the CPU 16 proceeds to the step S230.

If it is determined in the step S210 that the file exists in the HDD 15, the CPU 16 proceeds to the step S520, wherein the CPU 16 transfers the file to the RAM disk, by using the API hook. At this time, the CPU 16 simultaneously changes the access destination for accessing the file thereafter to the RAM disk, by using the API hook. That is, the access destination is changed such that the transferred file in the RAM disk is to be accessed. Then, the CPU 16 proceeds to the step S230.

In the step S230, the CPU 16 executes the existing system call having the same API name as the API hook, followed by terminating the present process.

By performing the above-described process, in a case where the frequency of access to a file in the HDD 15 has exceeded 1000 times per minute, the access destination of the file is changed to the RAM disk without making the application conscious of the change. This makes it possible to suppress occurrence of a too frequent access to the HDD 15, and reduce the HDD duty cycle.

FIG. 8 is a flowchart of a file re-transferring process performed by the first variation of the MFP 8. In this process, in a case where the frequency of access to a file which was transferred to the RAM disk by the process in FIG. 7 has ceased to exceed 1000 times per minute, the file is returned to the HDD 15. This process is performed by the CPU 16 that loads an associated program stored in the HDD 15, for executing this process, into the RAM 24.

The process in FIG. 8 is the same as the process in FIG. 3 in that the operations for detecting the access frequency to a file and transferring the file to the HDD 15 are added as the operation to be performed by using an API hook before executing an existing system call that uses a file descriptor. In the first variation, not only these operations, but also an operation for inhibiting, after returning the file to the HDD 15, the access destination of the file from being changed from the HDD 15 to the RAM disk is added. As one of methods for performing this operation, for example, at a time point the file is returned to the HDD 15, the file descriptor of the file in the RAM disk is closed by a close system call. With this, thereafter, even when an attempt of access to the file which was transferred from the HDD 15 to the RAM disk is made, the file is accessed using the file descriptor of the file in the HDD 15 as originally performed.

In the step S300, the CPU 16 detects, by using an API hook, whether the access frequency of a file whose access frequency exceeded 1000 times per minute has ceased to exceed 1000 times per minute. If the answer to the question of this step is negative (NO), the CPU 16 proceeds to the step S230.

If the answer to the question of the step S300 is affirmative (YES), the CPU 16 proceeds to a step S610, wherein the CPU 16 returns the file in the RAM disk to the HDD 15 by using the API hook. At this time, the CPU 16 simultaneously returns the access destination for accessing the file thereafter to the HDD by using the API hook. Then, the CPU 16 proceeds to the step S230.

In the step S230, the CPU 16 executes the existing system call having the same API name as the API hook, followed by terminating the present process.

By performing the above-described process, when the frequency of access to a file, which was transferred to the RAM disk by the process in FIG. 7 has ceased to exceed 1000 times per minute, the file is returned to the HDD 15, whereby it is possible to make effective use of the RAM disk having the limited capacity.

FIG. 9 is a flowchart of a file re-transferring process performed by the first variation of the MFP 8 when the shut-down is started. In this process, all of the files, which have been transferred to the RAM disk by the process in FIG. 7, are returned to the HDD 15 when the shut-down is started. This process is performed by the CPU 16 that loads an associated program stored in the HDD 15, for executing this process, into the RAM 24.

In the file re-transferring process in FIG. 9, the MFP 8, which is configured perform the process in FIG. 7 or 8 when executing the operation of an existing system call that uses a file descriptor, by using an API hook, performs the following four operations before starting the shut-down: detecting the start of the shut-down, detecting files which have been transferred to the RAM disk, transferring the files to the HDD 15, and inhibiting the access destination of the file from being changed from the HDD 15 to the RAM disk.

In the step S400, the CPU 16 detects whether or not the shut-down has been started, by using an API hook. If the shut-down has not been started, the step S400 is repeatedly executed until the shut-down is started.

If it is determined in the step S400 that the shut-down has been started, the CPU 16 proceeds to the step S410, wherein the CPU 16 searches for any files which have been transferred to the RAM disk by the process in FIG. 2, by using the API hook. If no files are detected in this step, the present process is immediately terminated.

If any files transferred to the RAM disk are detected in the step S410, the CPU 16 proceeds to a step S610, wherein the CPU 16 returns the detected files in the RAM disk to the HDD 15 by using the API hook. Further, the CPU 16 returns the access destinations for accessing the respective files thereafter to the HDD 15, by using the API hook, followed by terminating the present process.

By performing the above-described process, when the shut-down is started, all of the files, which have been transferred to the RAM disk by the process in FIG. 7, are returned to the HDD 15, whereby it is possible to prevent the files in the RAM disk from being lost due to the shut-down.

Next, a description will be given of a second variation of the MFP 8 as the example of the information processing apparatus according to the embodiment of the present invention. The second variation differs from the embodiment in processing performed by using the API hook in a case where the size of a file in the HDD 15, whose access frequency has exceeded 1000 times per minute, is not smaller than 10% of the capacity of the RAM disk. More specifically, in the above-mentioned case, when the file is accessed to additionally write data therein, only the data additionally written into the file is transferred to the RAM disk. On the other hand, even in the above-mentioned case, if no data is additionally written, the file is divided into divided data items each having a predetermined size or smaller, and only one of the divided data items, which includes an accessed portion of the file, is transferred to the RAM disk. In other respects, the second variation has the same configuration as that of the embodiment. Therefore, the same component elements as those of the embodiment are denoted by the same reference numerals, and description thereof is omitted.

Figure 10:
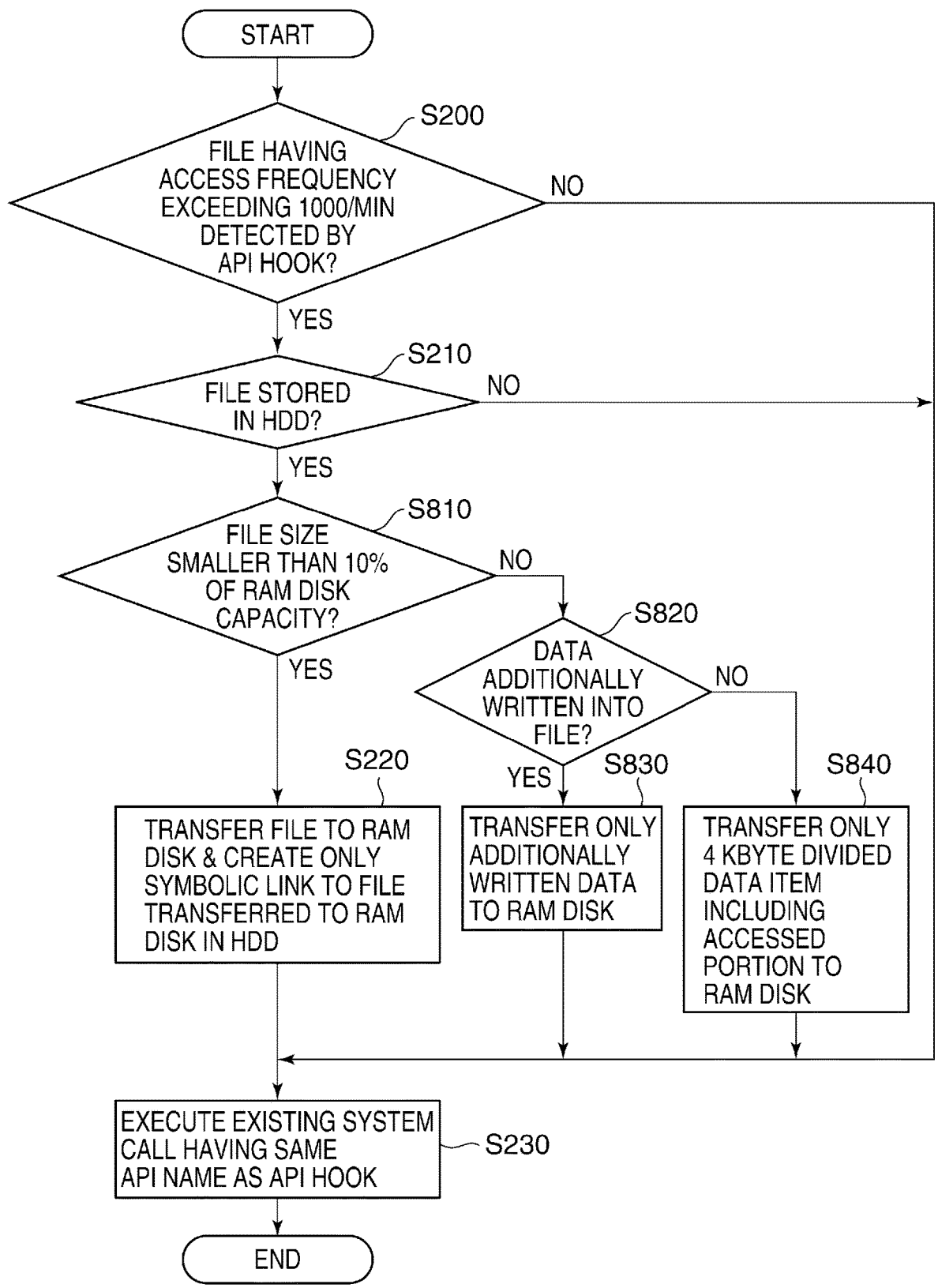
FIG. 10 is a flowchart of a process performed by a second variation of the MFP, for transferring a file from the HDD.
Figure 11:
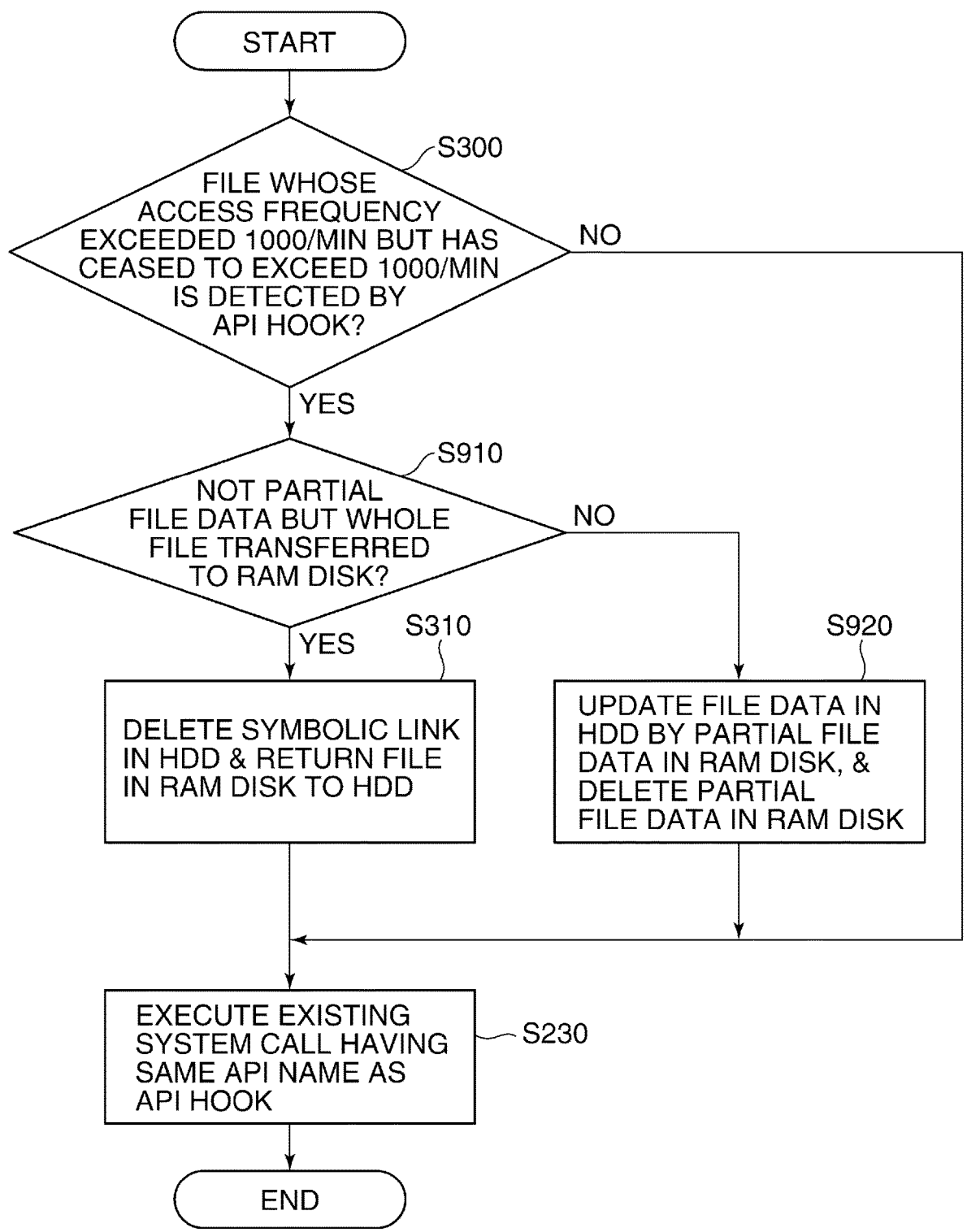
FIG. 11 is a flowchart of a file re-transferring process performed by the second variation of the MFP.
Figure 12:
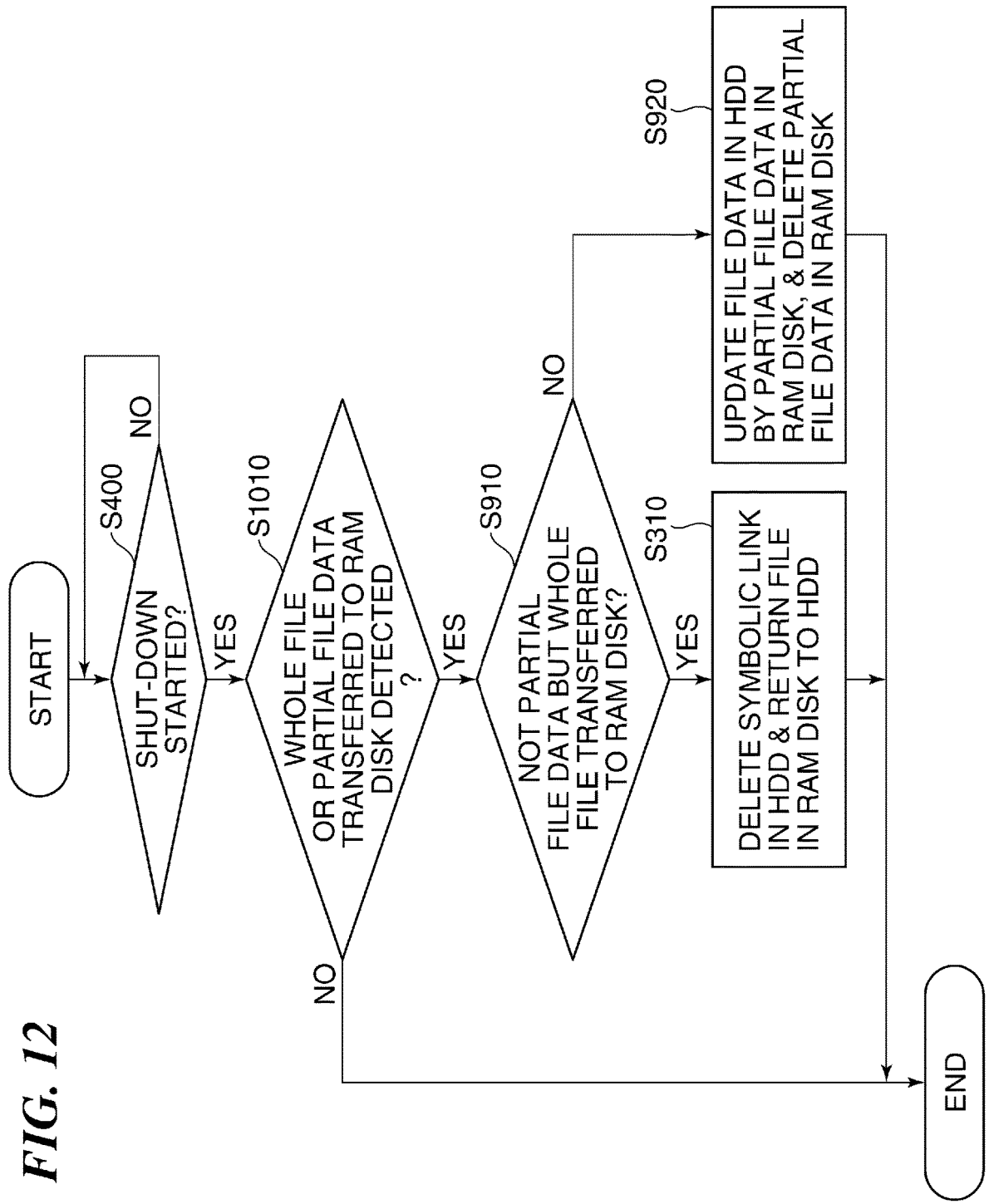
FIG. 12 is a flowchart of a file re-transferring process performed by the second variation of the MFP when shut-down is started.

The following description is given of the operation of an API hook for hooking a system call that uses a file descriptor, which is performed by the second variation of the MFP 8, with reference to FIGS. 10 to 12.

FIG. 10 is a flowchart of a process performed by the second variation of the MFP 8 according to the embodiment, for transferring a file from the HDD. In this process, when the frequency of access to a file in the HDD 15 has exceeded 1000 times per minute, it is determined whether or not the size of the file is not smaller than 10% of the capacity of the RAM disk. If it is determined that the file size is not smaller than 10% of the capacity of the RAM disk, and that data is additionally written therein by the access to the file, only the data additionally written into the file is transferred to the RAM disk. On the other hand, even in a case where it is determined that the file size is not smaller than 10% of the capacity of the RAM disk, if no data is additionally written therein, the file is divided into divided data items each having a predetermined size or smaller. After that, only one of the divided data items, which includes an accessed portion of the file, is transferred to the RAM disk. Note that if the size of the file is smaller than 10% of the capacity of the RAM disk, the same processing as that in the embodiment is performed. This process is performed by the CPU 16 that loads an associated program stored in the HDD 15, for executing this process, into the RAM 24.

In the process in FIG. 10, as the operation to be performed by using an API hook before executing the operation of an existing system call that uses a file descriptor, there are added, similar to the embodiment, the following three operations: detecting the access frequency to a file, creating a symbolic link, and transferring the file to the RAM disk. In the second variation, there added not only these operations, but also the following three operations: acquiring the size of the file whose access frequency has exceeded 1000 times per minute, detecting whether or not the acquired file size is not smaller than 10% of the capacity of the RAM disk, and transferring, only one of data items formed by dividing the file and each having a predetermine size or smaller, which includes an accessed portion of the file, or only data additionally written into the file, to the RAM disk. As one of methods for performing this, in a case where data is additionally written by the access to the file, first, the additionally written data is all transferred to the RAM disk. After that, the file is accessed based on the offset of the access destination of the file, which is found by lseek ( ). This makes it possible to selectively assign the access destination to the file in the HDD 15 or the additionally written data which has been transferred to the RAM disk. Further, if data is not additionally written by the access to the file, the file is divided into 4 Kbyte data items, and only one of the divided data items, which includes an accessed portion of the file, is transferred to the RAM disk. After that, the file is accessed based on the offset of the file access destination, which is found by lseek ( ). This makes it possible to selectively assign the access destination to the file in the HDD 15 or the data item resulting from the division and transferred to the RAM disk. Note that the additionally written data, and one of divided 4 Kbyte data items, which includes an accessed portion of the file, are generically referred to as the "partial file data". In doing the above, the data which has been transferred to the RAM disk is recorded in a management table with information indicative of whether the data is the whole file or the partial file data. Further, in a case where the data transferred to the RAM disk is the partial file data, correspondence between an associated file descriptor in the RAM disk and the offset between the file in the HDD 15 and the partial file data in the RAM disk the data is recorded in the management table. By performing these operations, also with respect to a file which may largely reduce the remaining storage capacity of the RAM disk, only partial file data including an accessed portion of the file is transferred to the RAM disk. Therefore, it is possible to transfer the data in the HDD 15 to the RAM disk without making the application conscious of the transfer.

Referring to FIG. 10, first, in the step S200, the CPU 16 detects, by using an API hook, whether an access frequency to a file has exceeded 1000 times per minute. If the answer to the question of this step is negative (NO), the CPU 16 proceeds to the step S230.

If the answer to the question of the step S200 is affirmative (YES), the CPU 16 proceeds to the step S210, wherein the CPU 16 determines whether or not the file exists in the HDD 15. If it is determined in the step S210 that the file does not exist in the HDD 15, the CPU 16 proceeds to the step S230.

If it is determined in the step S210 that the file exists in the HDD 15, the CPU 16 proceeds to a step S810, wherein the CPU 16 acquires the file size of the file, and determines whether or not the acquired file size is smaller than 10% of the capacity of the RAM disk, by using the API hook. If it is determined in the step S810 that the acquired file size is smaller than 10% of the capacity of the RAM disk, the CPU 16 proceeds to the step S220, wherein the CPU 16 creates a symbolic link to the file, in the HDD 15, and transfers the whole file to the RAM disk, leaving only the symbolic link in the HDD 15.

If it is determined in the step S810 that the acquired file size is not smaller than 10% of the capacity of the RAM disk, the CPU 16 proceeds to a step S820, wherein the CPU 16 determines whether or not the file is being accessed in order to additionally write data therein. If the file is being accessed in order to additionally write data therein, the CPU 16 proceeds to a step S830, wherein the CPU 16 transfers only the data additionally written into the file to the RAM disk, by using the API hook.

If it is determined in the step S820 that the file is not being accessed in order to additionally write data therein, the CPU 16 proceeds to a step S840, wherein the CPU 16 divides the file into 4 Kbyte data items, and transfers only one of the divided data items, which includes an accessed portion of the file, to the RAM disk, by using the API hook.

After execution of the steps S220, S830, and S840, in the step S230, the CPU 16 executes the existing system call having the same API name as the API hook, followed by terminating the present process.

As described above, in the case where the frequency of access to a file on the HDD 15 has exceeded 1000 times per minute, the file may have a large file size, such as a size not smaller than 10% of the capacity of the RAM disk. Even in such a case, by performing the above-described process, it is possible to suppress occurrence of a too frequent access to the HDD 15 without reducing the remaining storage capacity of the RAM disk. This makes it possible to reduce the HDD duty cycle.

Although in the present embodiment, it is determined whether or not the file size is smaller than 10% of the capacity of the RAM disk, the reference value is not limited to 10%. The reference value is only required to be a value which makes it possible to determine whether or not the file size is smaller than a predetermined ratio of the capacity of the RAM disk at which the remaining storage capacity of the RAM disk is largely reduced if the whole file is transferred to the RAM disk.

FIG. 11 is a flowchart of a file re-transferring process performed by the second variation of the MFP 8. In this process, if the frequency of access to a file having the whole or part thereof transferred by the process in FIG. 10 ceases to exceed 1000 times per minute, the whole or part of the file, which has been transferred to the RAM disk, is returned to the HDD 15. This process is performed by the CPU 16 that loads an associated program stored in the HDD 15, for executing this process, into the RAM 24.

In the process in FIG. 11, as the operation to be performed by using an API hook before executing the operation of an existing system call that uses a file descriptor, similar to the process in FIG. 3, there are added the following operations: detecting the frequency of access to a file, deleting a symbolic link, and transferring the file to the HDD 15. In the second variation, there are added not only these operations, but also the following two operations: updating, in a case where the data transferred to the RAM disk is partial file data, a corresponding part of the file in the HDD 15 using the transferred partial file data, and deleting the partial file data in the RAM disk. As one of methods for performing this, for example, in a case where partial file data of a file whose access frequency has ceased to exceed 1000 times per minute exists in the RAM disk, the corresponding file in the HDD 15 is updated using the partial file data.

Referring to FIG. 11, first, in the step S300, the CPU 16 detects, by using an API hook, whether the access frequency of a file whose access frequency exceeded 1000 times per minute has ceased to exceed 1000 times per minute. If the answer to the question of this step is negative (NO), the CPU 16 proceeds to the step S230.

If the answer to the question of the step S300 is affirmative (YES), the CPU 16 proceeds to a step S910, wherein the CPU 16 determines, by referring to the management table, whether the data having been transferred to the RAM disk by the process in FIG. 10 is partial file data or the whole file. If the data is the whole file (YES to the step S910), the CPU 16 proceeds to the step S310, wherein the CPU 16 deletes the symbolic link to the file in the HDD 15, and returns the whole file detected in the RAM disk to the HDD 15, by using the API hook.

On the other hand, if the data having been transferred to the RAM disk is partial file data (NO to the step S910), the CPU 16 proceeds to a step S920, wherein the CPU 16 updates the file data in the HDD 15 using the partial file data in the RAM disk, by using the API hook. At this time, the CPU 16 simultaneously deletes the partial file data in the RAM disk, by using the API hook.

After execution of the steps S310 and S920, in the step S230, the CPU 16 executes the existing system call having the same API name as the API hook, followed by terminating the present process.

By performing the above-described process, in a case where the frequency of access to a file having the whole file data or partial file data transferred to the RAM disk by the process in FIG. 10 has ceased to exceed 1000 times per minute, the whole file or the partial file data is returned to the HDD 15. This makes it possible to make effective use of the RAM disk having the limited capacity.

FIG. 12 is a flowchart of a file re-transferring process performed by the second variation of the MFP 8 when the shut-down is started. In this process, all of the files or the partial file data items, which have been transferred to the RAM disk by the process in FIG. 10, are returned to the HDD 15 when the shut-down is started. This process is performed by the CPU 16 that loads an associated program stored in the HDD 15, for executing this process, into the RAM 24.

In the file re-transferring process in FIG. 12, the MFP 8, which is configured to perform the process in FIG. 10 or 11 when executing the operation of an existing system call that uses a file descriptor, by using an API hook, performs the following five operations before starting the shut-down: detecting the start of the shut-down, detecting files or partial file data items which have been transferred to the RAM disk, deleting symbolic links, transferring the files to the HDD 15, and updating file data using partial file data.

In the step S400, the CPU 16 detects whether or not the shut-down has been started, by using the API hook. If the shut-down has not been started, the step S400 is repeatedly executed until the shut-down is started.

If it is determined in the step S400 that the shut-down has been started, the CPU 16 proceeds to a step S1010, wherein the CPU 16 searches for any whole files or partial file data items, which have been transferred to the RAM disk by the process in FIG. 10, by using the API hook. If no file or partial file data is detected in this step, the present process is immediately terminated.

If any whole files or partial file data items are detected in the step S1010, the CPU 16 proceeds to the step S910, wherein the CPU 16 determines whether the detected data is partial file data or whole file data. If the detected data is the whole file data (YES to the step S910), the CPU 16 proceeds to the step S310, wherein the CPU 16 deletes the symbolic link(s) to the file(s) in the HDD 15, and returns the detected whole file(s) in the RAM disk to the HDD 15, by using the API hook, followed by terminating the present process. On the other hand, if the detected data is partial file data (NO to the step S910), the CPU 16 proceeds to the step S920, wherein the CPU 16 updates the file data in the HDD 15 using the partial file data in the RAM disk, by using the API hook. At this time, the CPU 16 simultaneously deletes the partial file data in the RAM disk, by using the API hook, followed by terminating the present process.

By performing the above-described process, when the shut-down is started, all of the files or the partial file data items, which have been transferred to the RAM disk by the process in FIG. 10, are returned to the HDD 15. This makes it possible to prevent all of the files and the partial file data items in the RAM disk from being lost due to the shut-down.

In the above-described embodiment, and first and second variations, files and partial file data items are transferred from the HDD 15 to the RAM disk of the RAM 24. However, the destination to transfer data is not limited to the RAM disk, but any other volatile storage medium may be used insofar as the MFP 8 is configured such that files or partial file data items are transferred to the volatile storage medium. Further, although the processes in the embodiment and the first and second variations are performed by the MFP 8, the information processing apparatus according to the invention is not limited to the MFP 8, but may be applied to any other type of information processing apparatus insofar as it is an information processing apparatus that includes a non-volatile storage medium and a volatile storage medium, and executes a system call that uses a file descriptor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. Further, the above-described embodiment and variations may be partially combined.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

This application claims the benefit of Japanese Patent Application No. 2017-015414 filed Jan. 31, 2017, which is hereby incorporated by reference herein in its entirety.

What is claimed is:

1. An information processing apparatus including a non-volatile storage medium and a volatile storage medium, the information processing apparatus comprising:
a memory storing instructions; and
a processor that implements the instructions to execute a plurality of tasks, including:
a hooking task that provides hooking for a system call that uses a file descriptor;
a detection task that detects an access frequency to a file stored in the non-volatile storage medium, using the hooking task; and
a data access control task that controls storing of a file whose detected access frequency has exceeded a predetermined value, from the non-volatile storage medium to the volatile storage medium, using the hooking task, while controlling storing of a link of the file to the non-volatile storage medium.

2. The information processing apparatus according to claim 1, wherein the data access control task restores, in a case where the detected access frequency of the file has ceased to exceed the predetermined value after exceeding the predetermined value, the file, which is accessed from the volatile storage medium, to the non-volatile storage medium.

3. The information processing apparatus according to claim 1, wherein the data access control task restores, when shut-down is started, the file, which is accessed from the volatile storage medium, to the non-volatile storage medium.

4. The information processing apparatus according to claim 1, wherein the data access control task controls transferring of the file from the non-volatile storage medium to the volatile storage medium, using the hooking task.

5. The information processing apparatus according to claim 3, wherein the data access control task deletes the link in the non-volatile storage medium, using the hooking task.

6. The information processing apparatus according to claim 2, wherein in a case where the detected access frequency of the file has exceeded the predetermined value, the data access control task updates the file stored in the non-volatile storage medium to the file restored from volatile storage medium, using the hooking task.

7. The information processing apparatus according to claim 6, wherein the data access control task restores the file stored in the volatile storage medium to the non-volatile storage medium, using the hooking task, and then inhibits the access destination from being changed.

8. An information processing apparatus including a non-volatile storage medium and a volatile storage medium, the information processing apparatus comprising:
a processor configured to execute a plurality of tasks, including:
a hooking task that provides hooking for a system call that uses a file descriptor;
a detection task that detects a frequency of access to a file stored in the non-volatile storage medium, using the hook task; and
an access destination changing task that changes, in a case where a file whose detected access frequency has exceeded a predetermined value is accessed in order to additionally write data therein, only an access destination of the data which has been additionally written in the file, to the volatile storage medium, using the hooking task.

9. The information processing apparatus according to claim 8, the plurality of tasks including:
a dividing task that divides, in a case where the detected access frequency of the file has exceeded the predetermined value and the file is not accessed in order to additionally write data therein, the file into divided data items each having a predetermined size or smaller,
wherein in a case where the file is divided by the dividing task, the access destination change task transfers only one of the divided data items, which includes an accessed portion of the file, to the volatile storage medium, using the hook task.

10. The information processing apparatus according to claim 9, wherein in a case where the detected access frequency of the file has exceeded the predetermined value and the size of the file is smaller than a predetermined ratio of the capacity of the volatile storage medium, the access destination change task transfers the whole file to the volatile storage medium, using the hook task.

11. The information processing apparatus according to claim 10, the plurality of tasks include:
a management task that manages, in a case where data transfer is performed by the access destination change task, information indicating which of the whole file, the additionally written data, and the divided data item has been transferred to the volatile storage medium, and manage, in a case where one of the additionally written data and the divided data item has been transferred to the volatile storage medium, information of an offset between the file and the transferred data, and
a first determination task that determines, in a case where the detected access frequency of the file has ceased to exceed the predetermined value after exceeding the predetermined value, which of the whole file, the additionally written data, and the divided data item has been transferred to the volatile storage medium by the access destination change task, based on the information managed by the management task, and
wherein as a result of the determination by the first determination task, in a case where one of the additionally written data or the divided data item has been transferred to the volatile storage medium, the file in the non-volatile storage medium is updated using the transferred data, and the data transferred to the volatile storage medium is deleted, using the hook task.

12. The information processing apparatus according to claim 9, wherein in a case where one of the additionally written data or the divided data item, which has been transferred by the access destination change task, exists in the volatile storage medium when shut-down is started, the file in the non-volatile storage medium is updated using the transferred data, and the data transferred to the volatile storage medium is deleted, using the hook task.

13. The information processing apparatus according to claim 1, wherein the hook unit is an API hook.

14. A method of controlling an information processing apparatus including a non-volatile storage medium and a volatile storage medium, the method comprising:
   hooking a system call that uses a file descriptor, using an API hook;
   detecting an access frequency to a file stored in the non-volatile storage medium, using the API hook; and
   controlling storing of a file whose detected access frequency has exceeded a predetermined value, from the non-volatile storage medium to the volatile storage medium, using the API hook, while controlling storing of a link of the file to the non-volatile storage medium.

15. A method of controlling an information processing apparatus including a non-volatile storage medium and a volatile storage medium, the method comprising:
   hooking a system call that uses a file descriptor, using an API hook;
   detecting a frequency of access to a file stored in the non-volatile storage medium, using the API hook; and
   changing, in a case where a file whose detected access frequency has exceeded a predetermined value is accessed in order to additionally write data therein, only an access destination of the data which has been additionally written in the file, to the volatile storage medium, using the API hook.

16. A non-transitory computer-readable storage medium storing a computer-executable program executable by a computer to execute a method of controlling an information processing apparatus including a non-volatile storage medium and a volatile storage medium, the method comprising:
   hooking a system call that uses a file descriptor, using an API hook;
   detecting a frequency of access to a file stored in the non-volatile storage medium, using the API hook; and
   detecting an access frequency to a file stored in the non-volatile storage medium, using the API hook; and
   controlling storing of a file whose detected access frequency has exceeded a predetermined value, from the non-volatile storage medium to the volatile storage medium, using the API hook, while controlling storing of a link of the file to the non-volatile storage medium.

17. A non-transitory computer-readable storage medium storing a computer-executable program executable by a computer to execute a method of controlling an information processing apparatus including a non-volatile storage medium and a volatile storage medium, the method comprising:
   hooking a system call that uses a file descriptor, using an API hook;
   detecting a frequency of access to a file stored in the non-volatile storage medium, using the API hook; and
   changing, in a case where a file whose detected access frequency has exceeded a predetermined value is accessed to additionally write data therein, only an access destination of the data which has been additionally written in the file, to the volatile storage medium, using the API hook.

* * * * *